United States Patent [19]

Swartz et al.

[11] Patent Number: 4,642,555
[45] Date of Patent: Feb. 10, 1987

[54] DIFFERENTIAL CAPACITANCE DETECTOR

[75] Inventors: Harold L. Swartz, Glendale; Jeffrey C. Heidel, Phoenix, both of Ariz.

[73] Assignee: Sperry Corporation, New York, N.Y.

[21] Appl. No.: 696,626

[22] Filed: Jan. 31, 1985

[51] Int. Cl.[4] .................. G01R 11/52; G01R 27/26
[52] U.S. Cl. .............................. 324/60 C; 324/61 R
[58] Field of Search .............. 324/60 C, 60 CD, 61 R

[56] References Cited

U.S. PATENT DOCUMENTS 4,065,715 12/1977 Jaffe et al. .................... 324/60 CD

*Primary Examiner*—Stanley T. Krawczewicz
*Attorney, Agent, or Firm*—Howard P. Terry

[57] ABSTRACT

A differential capacitance detector comprising two pulse generators and a comparator. The width of each pulse generator output is representative of the capacity of each of two capacitors whose differential is to be determined. A comparator provides a third pulse whose width is the difference of the width of the pulses input from the pulse generators and is representative of the capacitance differential between the two capacitors.

7 Claims, 2 Drawing Figures

DIFFERENTIAL CAPACITANCE DETECTOR

BACKGROUND OF THE INVENTION

1. Field of the Invention

The invention relates to determination of the relative difference in capacity between two capacitors and, more particularly, to angular measurement with respect to gravity using a capacitive sensor.

2. Description of the Prior Art

Prior art designs of capacitive sensors used to provide an angular measurement with respect to gravity consist of utilizing the capacitive elements in bridge circuits excited by a high frequency oscillator. Changes in capacitance due to tilt unbalance cause the bridge circuit to provide a change in the output frequency or a change in the output voltage level. An apparatus of the foregoing type is described in U.S. Pat. No. 4,442,243, issued Dec. 27, 1983. Another prior art device incorporates a force feedback accelerometer wherein a mass is suspended between electromagnets. As the assembly is tilted, the mass moves. Power is applied to the magnets to recenter the mass. The current required to recenter the mass is converted to a measure of angular displacement. The present invention uses the capacities of a capacitive sensor at a tilt angle to establish two pulses of different widths, provides circuitry to determine the relative pulse widths and supplies a signal, derived from the relative pulse widths, that is representative of the tilt angle.

SUMMARY OF THE INVENTION

The present invention determines the difference in capacitance between two capacitors by providing an output pulse whose width is representative of a change in capacitance. The present invention may be used to determine tilt of a capacitive gravity sensor by incorporating a sensor capacitor into each of two one shot multivibrator circuits. The output pulse of each multivibrator depends on the time constant of an RC network of which the capacitive portion consists of one of the sensor capacitors. As the gravity sensor is tilted, the capacitance in each RC network changes; one increasing and the other decreasing. Thus, the output pulse of each one shot multivibrator will vary in width as the capacitance of the RC network changes and the difference in width between the two one shot multivibrator outputs, as determined by a comparator, will be directly proportional to the amount of tilt.

DESCRIPTION OF THE PREFERRED EMBODIMENT

Figure 1:
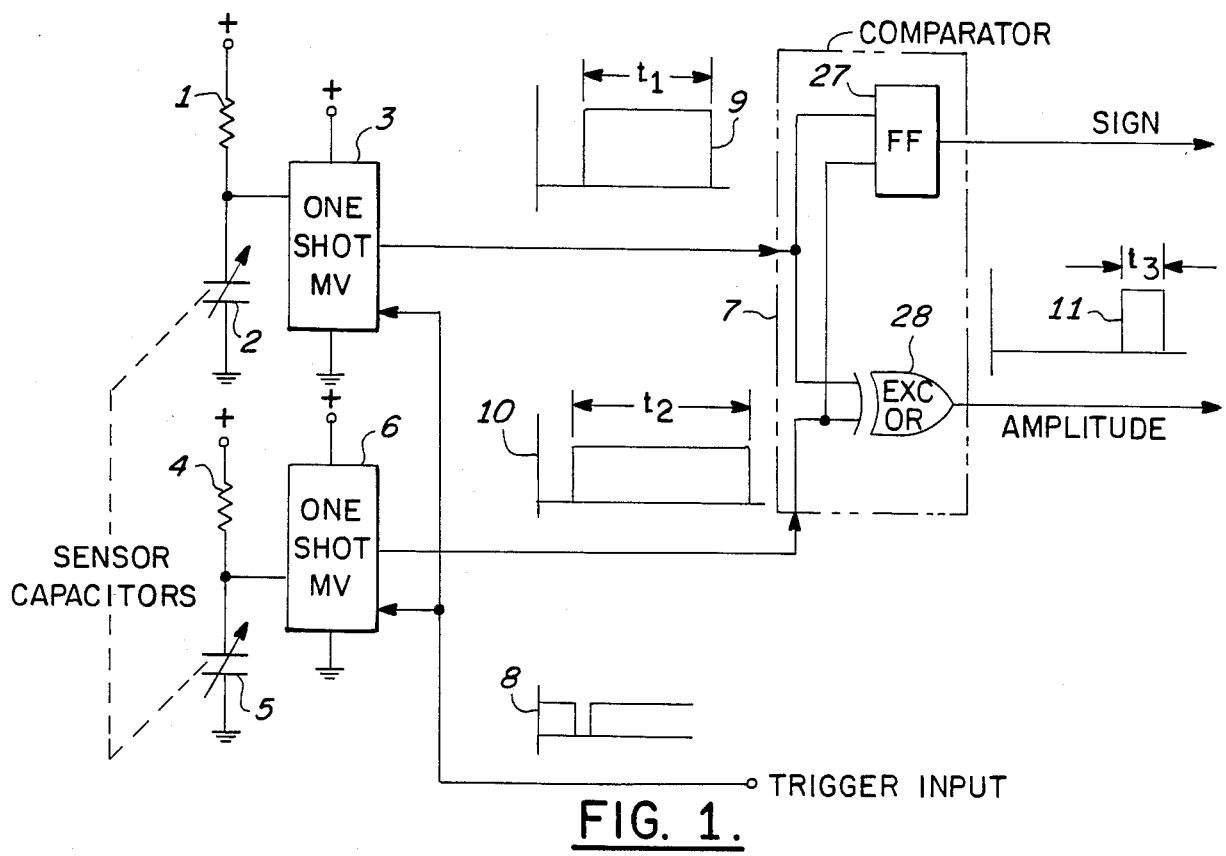
FIG. 1 depicts an apparatus for digitally representing the difference in capacitance between two capacitors.

FIG. 1 depicts an apparatus which provides an output pulse whose width is representative of the difference in capacity between two capacitors. Referring to FIG. 1, the difference in capacity of capacitors 2 and 5 are to be determined and may be, for example, the capacitors of a capacitive gravity sensor (not shown) such as described in Assignee's copending U.S. patent application Ser. No. 696,625, filed on the date of the patent application for the instant invention.

Typically, a capacitive gravity sensor appears as two capacitors 2 and 5 whose range may be approximately 12 picofarads at minimum to 280 picofarads at maximum. When a capacitive gravity sensor is level, the capacitance of capacitors 2 and 5 are substantially equal typically, for example, 140 picofarads. The capacitance of capacitors 2 and 5 vary differentially as the sensor is tilted. Resistor 1 and capacitor 2 connected in series to form an RC circuit, as part of one shot multivibrator 3, whose time constant determines the width of pulse 9. In operation, trigger input 8 causes a one shot multivibrator 3 to change states represented by the leading edge of output pulse 9. One shot multivibrator 3 continues to output pulse 9 for time $t_1$, as determined by the RC time constant of resistor 1 and capacitor 2, before returning to its original state as represented by the trailing edge of pulse 9.

Similarly, resistor 4 and capacitor 5 form the RC circuit of one shot multivibrator 6. The width $t_2$ of output pulse 10 being representative of the RC time constant of resistor 4 and capacitor 5. The output pulses 9 and 10 from one shot multivibrators 3 and 6 respectively are coupled to comparator 7. Comparator 7 may be, for example, an exclusive OR gate 28 whose output 11, a pulse of width $t_3$, is representative of the difference in duration between pulses 9 and 10. Pulse 11 is thus directly proportional to the tilt of capacitance gravity sensor depicted, which form capacitors 2 and 5. Comparator 7 may also include R-S flip-flop 27. The direction of tilt, either clockwise or counterclockwise is provided by the output of flip-flop 27. Output from flip-flop 27 will stay high if pulse 9 was last high or it will stay low if pulse 10 was last high, thus indicating the direction of tilt of a capacitive gravity sensor.

Figure 2:
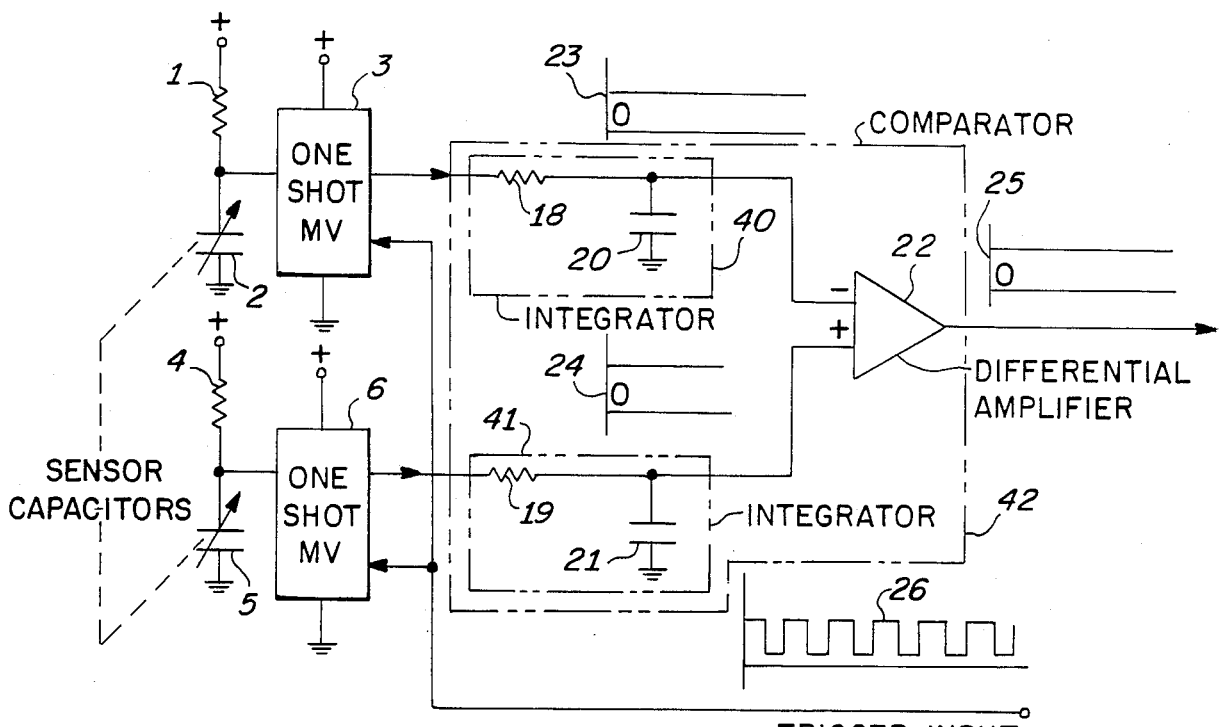
FIG. 2 depicts an alternative embodiment for representing the difference in capacitance between two capacitors as an analog signal.

FIG. 2 depicts an apparatus which provides an analog output representative of the difference in capacity of two capacitors 2 and 5. Referring now to FIG. 2, wherein elements previously referenced have the same reference numeral, output pulses 9 and 10 from one shot multivibrators 3 and 6 are derived in the same manner as in the description of FIG. 1 above. Trigger input 26 pulses one shot multivibrators 3 and 6 at an appoximate rate of 100 Hz. The output pulses 9 and 10 are coupled to integrators 40 and 41 respectively. Integrators 40 and 41 may, for example, consist of RC networks 18 and 20 and 19 and 21, respectively. Integrators 40 and 41 output DC voltages 23 and 24 which are coupled to difference amplifier 22 whose output is a DC voltage 25 representative of the difference in voltage between DC voltages 23 and 24.

Thus, the apparatus in FIG. 2 determines the difference in capacitance between two capacitors 2 and 5, which may be part of a capacitive gravity sensor and therefore a measure of tilt, by generating a DC voltage 25 having an amplitude which varies with the difference in capacitance thereby indicating the tilt angle and having a polarity which indicates the tilt direction.

While the invention has been described in its preferred embodiments, it is to be understood that the words which have been used are words of description rather than of limitation and that the changes within the purview of the appended claims may be made without departing from the true scope and spirit of the invention in its broader aspects.

We claim:

1. A differential capacitance detector comprising:

first monostable pulse generator means for generating a first pulse having a substantially constant amplitude and having a width representative of a capacitance value of a first sensing capacitor;

second monostable pulse generator means for generating a second pulse having a substantially constant amplitude and having a width representative of a capacitance value of a second sensing capacitor; and comparator means coupled to receive said first and second pulses and responsive to pulse durations thereof for providing a third signal representative of pulse width differences between said first and second pulses, thereby representative of capacitive difference between said first and second sensing capacitors.

2. Differential capacitance detector according to claim 1 wherein said comparator means includes means for providing a signal to indicate which of said first and second pulses is of greater width.

3. Differential capacitance detector according to claim 2 wherein said means for providing a signal to indicate which of said first and second pulses is of greater width is an R-S flip-flop.

4. Differential capacitance detector according to claim 2 wherein said first and second monostable generator means are respectively coupled to first and second fixed resistors and said first and second capacitors, thereby establishing RC time constants that determine said pulse widths of said first and second pulses.

5. Differential capacitance detector according to claim 2 wherein said comparator means further includes an exclusive OR gate coupled to receive said first and second pulses to provide said third signal as a pulse.

6. Differential capacitance detector according to claim 1 wherein said comparator means includes a first and second integrator means coupled to receive said first and second pulses respectively for providing a first and second DC voltage signals representative of integrated values, and a difference amplifier coupled to receive said first and second DC voltages to provide a DC output voltage representative of differences between said first and second DC voltages and thereby capacitive differences between said first and second capacitors.

7. Differential capacitance detector according to claim 6 wherein each said first and second integrator means comprises an R-C integrator network.

* * * * *